United States Patent [19]
Olsson

[11] 3,985,372
[45] Oct. 12, 1976

[54] HAND-CART WITH COLLAPSIBLE WHEELS

[75] Inventor: Curt Sigvard Olsson, Bandhagen, Sweden

[73] Assignee: SIKOB Svensk Industris Konstrucktions och Berakningskontor AB, Sollentuna, Sweden

[22] Filed: Apr. 16, 1975

[21] Appl. No.: 568,652

[30] Foreign Application Priority Data
Apr. 22, 1974 Sweden.............................. 7405394

[52] U.S. Cl................................ 280/652; 280/655; 280/DIG. 6
[51] Int. Cl.²............................................ B62B 3/02
[58] Field of Search............ 280/36 C, 41 D, 41 C, 280/41 R, 47.26, 47.27, DIG. 6, 40, 641, 646, 651, 652, 655, 645, 39, 41

[56] References Cited
UNITED STATES PATENTS

| | | | |
|---|---|---|---|
| 2,711,027 | 6/1955 | Williamson................... | 280/DIG. 6 |
| 3,544,126 | 12/1970 | Spielman.......................... | 280/41 C |

FOREIGN PATENTS OR APPLICATIONS

| | | | |
|---|---|---|---|
| 166,283 | 10/1953 | Australia....................... | 280/DIG. 6 |
| 658,596 | 10/1951 | United Kingdom............ | 280/DIG. 6 |

Primary Examiner—Robert R. Song
Assistant Examiner—Michael J. Forman
Attorney, Agent, or Firm—Haseltine, Lake & Waters

[57] ABSTRACT

A collapsible wheeled cart, in particular a golf cart, comprises a chassis structure capable of supporting a load, for instance a golf bag, on its one side and two wheel struts carrying wheels at their outer ends and having their opposite ends attached to the chassis structure and being collapsible from a running position, in which the wheels are disposed in parallel planes substantially perpendicular to the load supporting plane of the chassis structure and parallel to the running direction of the cart, therefor a collapsed position, in which the wheels are disposed close to the opposite side of the chassis structure side by side in a substantially common plane substantially parallel to the load supporting plane of the chassis structure.

4 Claims, 5 Drawing Figures

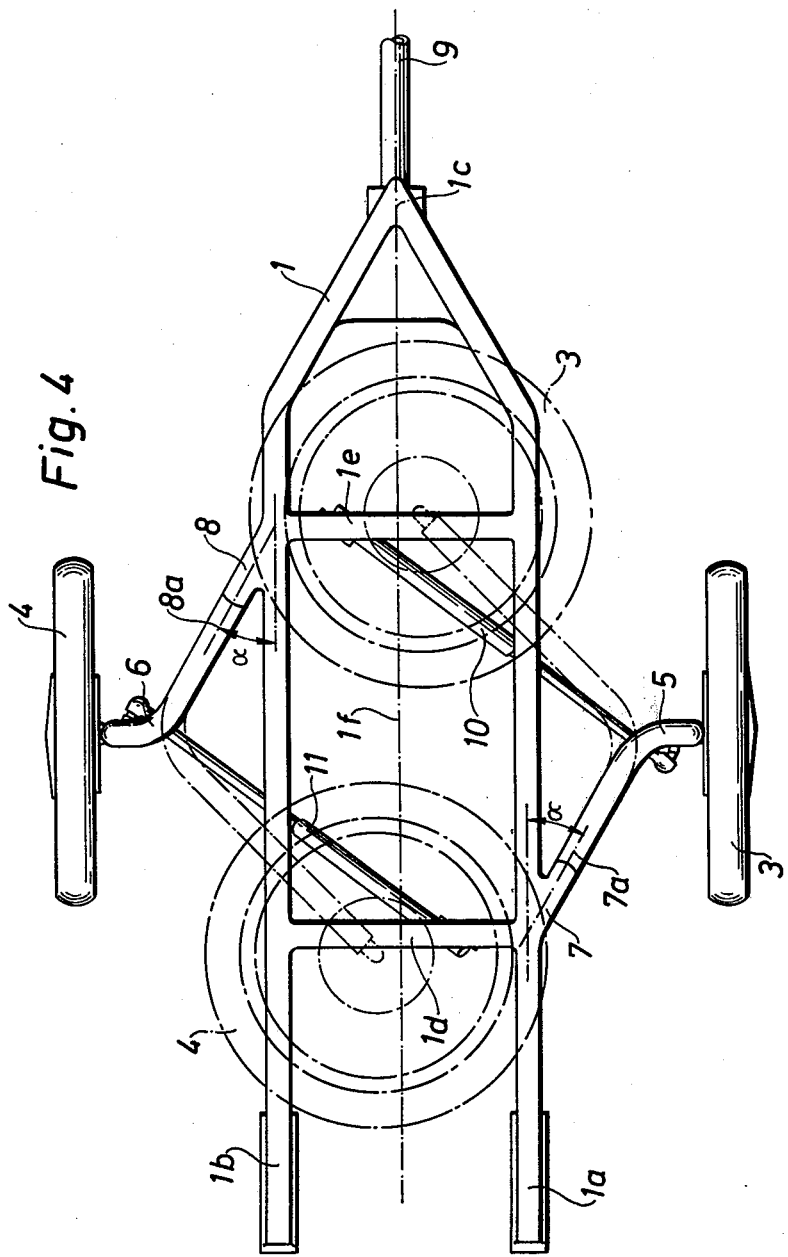

HAND-CART WITH COLLAPSIBLE WHEELS

The present invention is related to a hand-cart with collapsible wheels and particularly a golf cart.

For golf carts and similar hand-carts or trolleys, as for instance luggage trolleys, it is an essential requisite that the cart can be collapsed when not in use so as to obtain smallest possible overall dimensions and also a shape suitable for storing so as to require as little space as possible when being transported or stored in its collapsed state. It should be possible to convert the cart to its collapsed state in a simple and rapid manner with a minimum of manipulations and this should be possible with the load, for instance a golf bag, maintained in its normal position of the cart. The best result from the point of view of storing space seems to be obtained if the wheels and the wheel carrying struts of the cart can be folded from their normal running position to a folded or collapsed position, in which the wheel struts and above all the wheels are positioned close to and substantially parallel to the lower side of the load carrying chassis structure of the cart. However, in this collapsed position the wheels should not project outside the outer contour or circumference of the chassis structure or the load, for instance the golf bag, mounted thereon, in spite of the fact that the wheel struts together with the wheels should in most cases preferably have a length which exceeds substantially the width of the chassis structure or the load, for instance the golf bag.

Prior art designs for providing such a collapsible feature of the wheel struts and the wheels of a golf cart or a similar hand-cart suffer from several serious disadvantages. In some prior art cart designs wheel struts having a very short length and wheels with a small diameter are employed such construction results in inferior running characteristics of the cart, particularly when it must be propelled over uneven and irregular ground as generally required for a golf cart. For a golf cart it is also an important requisite that it shall have a stable and fairly upright position when standing on its two wheels and the rear end of the chassis structure, and this can be achieved only if the wheel struts are relatively long and attached to the chassis structure at a point well spaced from the rear end of the chassis structure. In other prior are designs, in order to obtain wheel struts of desired length and wheels with a desired large diameter, there is employed for each collapsible wheel strut two pivot or rotary joints between the wheel strut and the chassis structure. Of course, it must be possible to lock both these pivot or rotary joints at least in the running position of the wheel strut. These prior art designs are therefore, relatively complicated and, consequently, expensive and time-consuming to manufacture. Moreover, the required construction tends also to increase the weight of the cart. The large number of pivot or rotary joints for the wheel struts increases also, of course, the likelihood of play and instability in the running gear of the cart after prolonged use. Further, the operation for bringing the wheels and wheel struts from their running position to their collapsed position and vice versa is generally comparatively complicated and requires a lot of manipulation.

The primary object of the present invention is therefore to provide a collapsible hand-cart, in particular a golf cart, which is improved in the respects discussed above and which comprises a rigid chassis structure defining a support plane which is capable of supporting a load, as for instance a golf bag, on its one side and two wheel struts carrying wheels at their one ends and having their opposite ends attached to the chassis structure and being collapsible from a running position, in which the wheels are disposed in parallel planes substantially perpendicular to the support plane of the chassis structure and parallel to a center line of the chassis structure, as well as parallel to the intended running direction of the cart, and a collapsed position, in which the wheels are disposed close to the opposite side of the chassis structure. According to the invention, the cart is characterized in that each wheel strut has the opposite end journalled in the chassis structure for rotation about an axis which is inclined at an acute angle relative to the direction of said center line of the chassis structure as well as relative to said support plane of the chassis structure, and that these axes of rotation for said two wheel struts are inclined in mutually opposite directions relative to the direction of said center line of the chassis structure as well as relative to the support plane of the chassis structure, whereby by rotation of the wheel struts about their axes of rotation from the running position to the collapsed position the wheels are brought to positions side by side in a substantially common plane which is substantially parallel to the support plane of the chassis structure.

As a result of the special rotational mounting of the wheel struts in the chassis structure all the desired features discussed in the foregoing are achieved. Thus, it is possible without any difficulties to use wheel struts having a desired large length and to use wheels having a desired large diameter. Further, the wheel struts can be folded from their normal running positions, in which the wheels are substantially vertical and parallel to the running direction of the cart to a collapsed position in which both wheels are disposed side by side in a substantially common plane close to the lower side of the chassis structure of the cart and, if desired, with the wheels completely parallel to the plane of the chassis structure and still not projecting outside the outer contour or circumference of the chassis structure or of the load mounted thereon, as for instance a golf bag, whereby the collapsed cart achieves a thin and flat shape with smallest possible total dimensions. In spite of this it is possible to use entirely rigid wheel struts and for each wheel strut only a single rotary joint is required at the point where the wheel strut is attached to the chassis structure of the cart. In this way a simple, inexpensive, lightweight and stable construction is achieved, which is also easy to manufacture.

In the following the invention will be described more in detail with reference to the accompanying drawings, which show by way of example some embodiments of a golf cart according to the invention. In the drawings:

FIG. 4 is a top view of the golf cart in FIG. 1 with the wheels and wheel struts shown with solid lines in their running position and with broken lines in their collapsed position.

Figure 1:
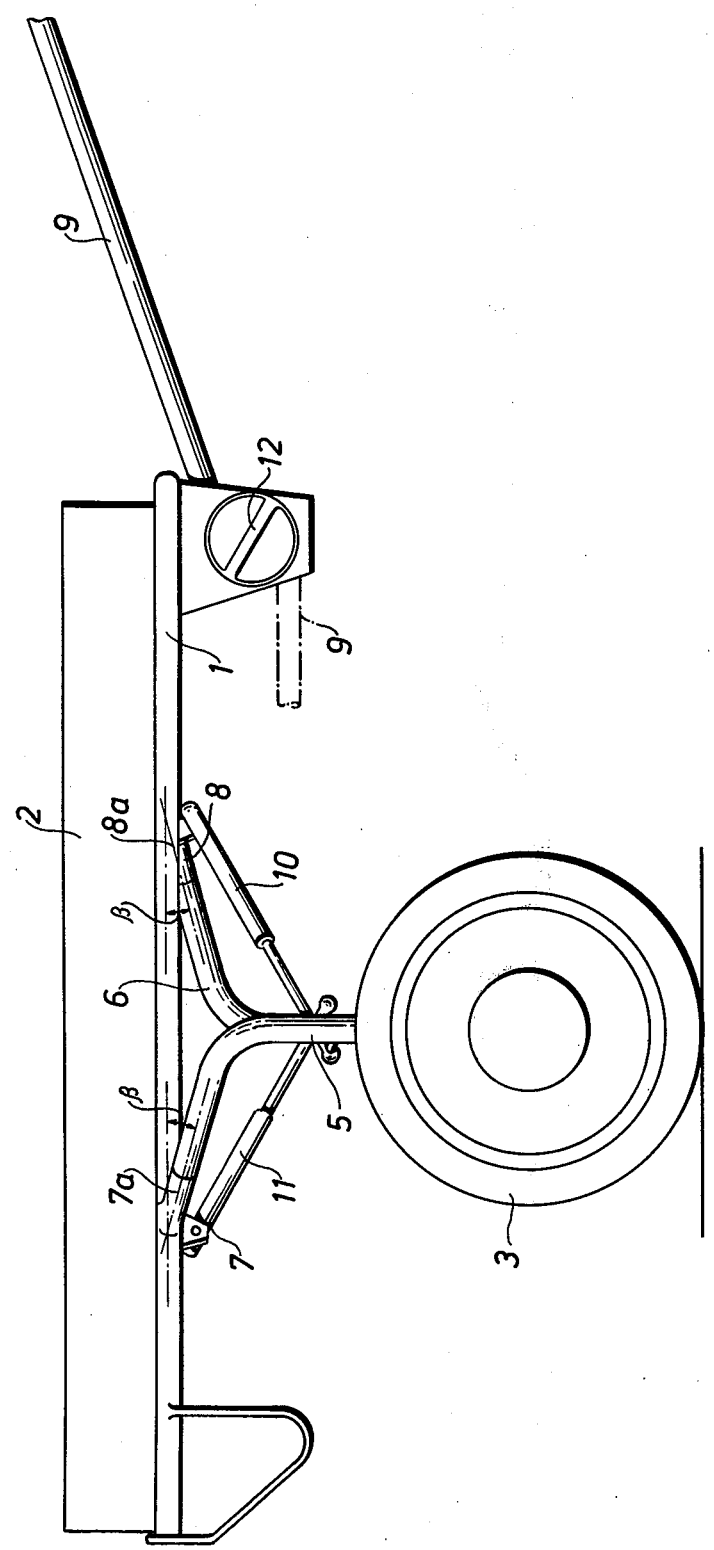
FIG. 1 is a side-view of a first embodiment of a golf cart according to the invention with the wheels shown in their running position.
Figure 2:
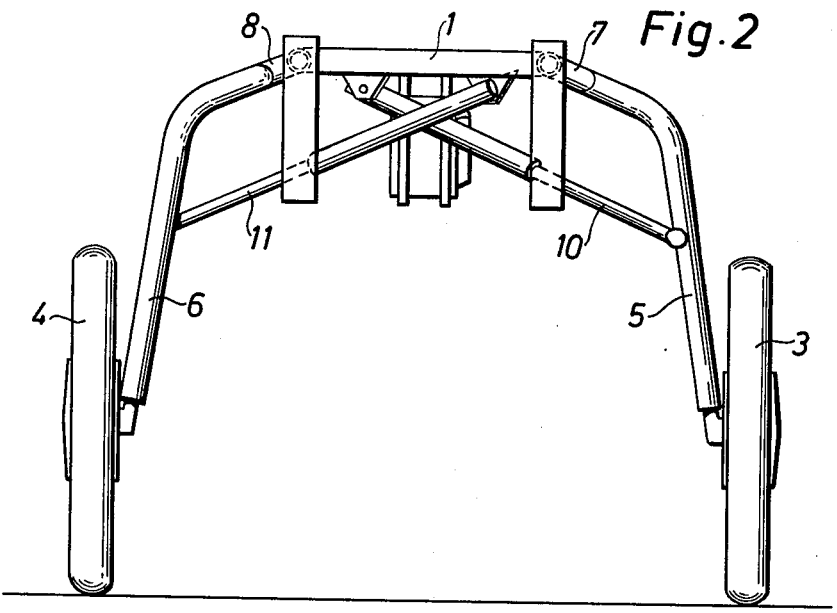
FIG. 2 is a rear end view of the golf cart in FIG. 1 with the wheels shown in their running position.

FIGS. 1 to 4 show by way of example a golf cart embodying the invention, which comprises a rigid, load supporting chassis structure 1, which in the illustrated example is designed as a substantially rectangular frame having two longitudinal tubular side members 1a and 1b, which are joined to each other at the front end 1c of the chassis structure and interconnected by two tubular cross members 1d and 1e. on the upper side of this chassis structure 1 a golf bag 2 can be attached in any suitable conventional manner, as schematiscally indicated in FIG. 1. Further, the cart is provided with two wheels 3 and 4 which are mounted at the outer ends of associated wheel struts 5 and 6, respectively.

Figure 3:
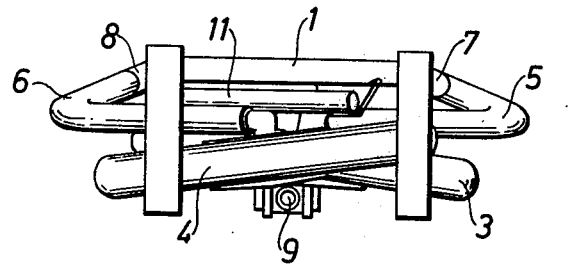
FIG. 3 is a view similar to that in FIG. 2 but with the wheels shown in their collapsed position.

In the illustrated embodiment each wheel strut 5 and 6, respectively, is bent at an angle and has its upper end mounted for rotation about a bearing pin 7 and 8, respectively, which is rigidly attached in a suitable manner to the adjacent side member 1a, 1b of the chassis structure 1. Each wheel strut 5 and 6, respectively, is axially unmovable on its bearing pin 7 and 8, respectively, but rotatable about the axis 7a and 8a, respectively, of the bearing pin. As can be most readily seen in FIGS. 1 and 3, the bearing pins 7 and 8 for the wheel struts 5 and 6, respectively, are oriented in such a manner that the axis of rotation 7a and 8a, respectively, for each wheel strut 5 and 6, respectively, is inclined at an acute angle, the angle $\alpha$ in FIG. 4, relative to the direction of the center line 1f of the chassis structure 1, which is parallel to the running direction of the cart, and also inclined at an acute angle, the angle 8 in FIG. 1, relative to the plane of the chassis structure 1. Further, the axes of rotation 7a and 8a for the wheel struts 5 and 6, respectively, are inclined in mutually opposite directions relative to the center line 1f of the chassis structure as well as relative to the plane of the chassis structure. As a result of these inclined orientations of the rotation axes 7a and 8a of the wheel struts 5 and 6, respectively, relative to the chassis structure 1, the wheel struts 5, 6 with the wheels 3, 4 can be folded or collapsed from the running positions shown in solid lines in FIGS. 1, 2 and 4 to the collapsed position shown in solid lines in FIG. 3 and in broken lines in FIG. 4 and in which folded position the wheel struts and the wheels are disposed side by side in a subtantially common plane close to the lower side of the chassis structure 1 with the wheels substantially parallel to the plane of the chassis structure. In the illustrated example the wheels are not completely parallel to the plane of the chassis structure 1 when in their collapsed position, as illustrated in FIG. 3, as in the illustrated example it is in any case necessary to provide room for a folded handle 9, as will be described more in detail hereinafter. However, by suitable selection of the angles of inclination $\alpha$ and $\beta$ for the rotation axes 7a and 8a of the wheel struts 5 and 6, respectively, it is quite possible to position the wheels completely parallel to the plane of the chassis structure 1 when in their folded or collapsed position.

The wheel struts 5 and 6 are latched in their running position in any suitable manner, for instance by means of struts 10 and 11, respectively, as schematically illustrated in the drawings. In the illustrated example these struts 10 and 11 are telescopic and can be latched in their extracted position by means of suitable snap latches. Of course other types of latching means may also be used. Thus, for instance, the necessary latching or locking means nay be arranged at the bearing pins 7 and 8 for the wheel struts 5 and 6.

In the example illustrated in the drawings, a tubular or rod-shaped handle 9 is attached to the front end of the chassis structure 1. This handle can be swung about an axis 12 from the projecting working position shown in solid lines in FIG. 1 to a folded or collapsed position shown in broken lines in FIG. 1 and in solid lines in FIG. 3, in which folded position the handle extends parallel to the lower side of the chassis structure 1 on the outside of the wheels 3 and 4 when these are in their collapsed position, whereby the handle 9 retains the wheels in their collapsed position. By means of a suitable clamping device the handle 9 can be locked in any angular position about the axis 12.

From the foregoing it will be appreciated that the design of the chassis structure 1 of the cart is insignificant with respect to the invention and that the chassis structure may be designed in various other ways than as illustrated in the drawings, dependent on the specific object and intended use of the cart. Thus, for instance, it is not necessary that the chassis structure 1 be completely symmetrical about a center line parallel to the running direction of the cart. Even if the chassis structure is unsymmetrical, it is possible, however, to define a center line of the chassis structure parallel to the running direction of the cart as well as a load supporting plane of the chassis structure and to which center line and load supporting plane, respectively, the inclination of the rotation axes 7a and 8a of the wheel struts can be related.

It will also be appreciated that the structural design in detail of the rotatable mounting of the wheel struts at the chassis may vary considerably dependent on the specific design of the chassis structure and the wheel struts. It is essential only that the axes of rotation for the wheel struts relative to the chassis structure be inclined in the manner described hereinabove.

Figure 5:
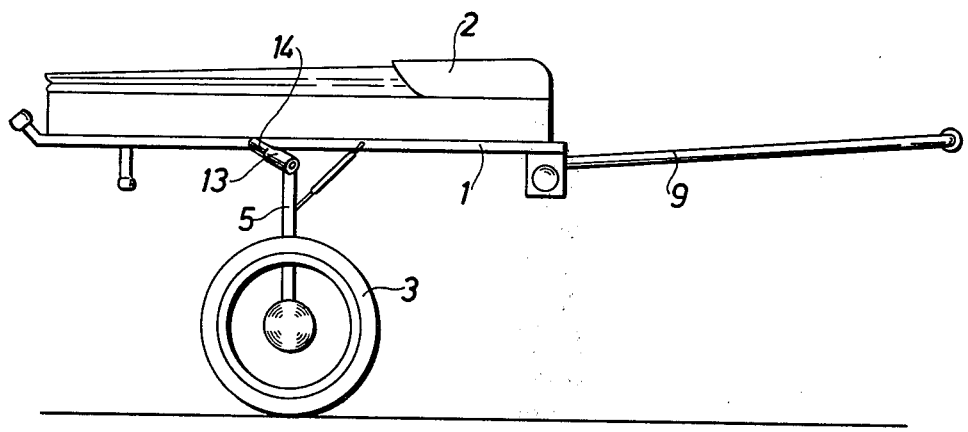
FIG. 5 is a schematic side-view of a second embodiment of a golf cart according to the invention.

FIG. 5 shows schematically another embodiment of a golf cart according to the invention in which the rotatable mounting of the wheel struts in the chassis structure is designed in a somewhat different manner as compared with the golf cart illustrated in FIGS. 1 to 4. In the golf cart illustrated in FIG. 5 the upper end of the only wheel strut 5 visible in the drawing is fixed to a bearing sleeve 13 which is mounted for rotation on a bearing pin 14 which is fixed to the chassis structure 1 with the desired inclined orientation. In this embodiment the wheel strut 5 is substantially straight, wherefore the two wheel struts of the cart are attached to the chassis structure 1 at points located substantially opposite to each other on opposite sides of the chassis structure 1 and are not mutually spaced in the longitudinal direction of the chassis structure as in the embodiment illustrated in FIGS. 1 to 4.

Although in the foregoing the invention has been described as applied to a golf cart, it is appreciated that the invention may with the same advantages be applied also to other types of hand-carts, as for instance luggage carts, bicycle trailers and similar carts and trolleys.

I claim:

1. A collapsible wheeled cart, particularly a golf cart, comprising a rigid chassis structure defining a support plane and having a center line parallel to the running direction of the cart and capable of supporting a load, for instance a golf bag, on its one side, and two wheel struts provided with wheels at their one ends and having their opposite ends attached to the chassis structure, means cooperating with said wheel struts for retaining said wheel struts in a running position and said wheel struts being collapsible from said running position, in which the wheels are located in parallel planes substantially perpendicular to said support plane of the chassis structure and parallel to said center line of the chassis structure to a collapsed position, in which the wheels are located close to the opposite side of the chassis structure, each wheel strut having its end opposite to the associated wheel journalled in the chassis structure for rotation about an axis which is inclined at an acute angle relative to the direction of said center line of the chassis structure as well as relative to said support plane of the chassis structure, said axis of rotation for the one wheel strut and said axis of rotation for the other wheel strut, respectively, being inclined in mutually opposite directions relative to said center line of the chassis structure as well as relative to said support plane of the chassis structure, so that by rotation of the wheel struts about the axes of rotation from said running position to said collapsed position the wheels are brought into positions side by side in a substantially common plane substantially parallel to said support plane of the chassis structure.

2. A cart according to claim 1, wherein the two wheel struts are attached to the chassis structure at two opposite longitudinal sides of the chassis structure.

3. A cart according to claim 1, wherein each wheel strut is bent at an angle and includes a first portion closest to the chassis structure, said first portion being coaxial to the axis of rotation of the wheel strut, and a second portion closest to the associated wheel, said second portion being substantially vertical when the wheel strut is in its running position.

4. A cart according to claim 1, wherein an elongated handle is attached to one end of the chassis structure in the running direction of the cart, said handle being foldable from a working position projecting from the chassis structure substantially in the running direction of the cart to a folded position in which the handle extends substantially parallel to the opposite side of the chassis structure on the outside of the wheels when said wheels are in their collapsed position so as to retain the wheels in said collapsed position.

* * * * *